(12) United States Patent
Nakayama (10) Patent No.: US 11,162,468 B2
(45) Date of Patent: Nov. 2, 2021

(54) CONTROL DEVICE

(71) Applicant: TOYOTA JIDOSHA KABUSHIKI KAISHA, Toyota (JP)

(72) Inventor: Shigeki Nakayama, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 16/256,506

(22) Filed: Jan. 24, 2019

(65) Prior Publication Data
US 2019/0234366 A1     Aug. 1, 2019

(30) Foreign Application Priority Data
Jan. 31, 2018 (JP) .............................. JP2018-015489

(51) Int. Cl.
*B60K 6/00* (2006.01)
*F02N 11/08* (2006.01)
*F02D 41/02* (2006.01)
*B60L 58/12* (2019.01)
*B60R 16/03* (2006.01)
(Continued)

(52) U.S. Cl.
CPC .......... *F02N 11/0862* (2013.01); *B60L 58/12* (2019.02); *B60R 16/03* (2013.01); *F02D 29/02* (2013.01); *F02D 41/024* (2013.01); *F02N 11/04* (2013.01); *H01M 10/44* (2013.01);
(Continued)

(58) Field of Classification Search
CPC ................. B60W 10/06; B60W 10/08; B60W 2510/068; B60K 6/46; B60L 2240/445; B60L 58/12; Y02T 10/6217; Y02T 10/6286; F02N 11/0862; F02N 11/04; B60R 16/03; F02D 29/02; F02D 41/024; H01M 10/44; H02J 7/14
See application file for complete search history.

(56) References Cited

U.S. PATENT DOCUMENTS 5,785,138 A *  7/1998  Yoshida ................... B60K 6/46
                                                        180/65.245
6,202,615 B1 *  3/2001  Pels ....................... F02N 11/0866
                                                        123/179.21
(Continued)

FOREIGN PATENT DOCUMENTS

JP           2017-166463           9/2017

*Primary Examiner* — Gonzalo Laguarda
(74) *Attorney, Agent, or Firm* — Oblon, McClelland, Maier & Neustadt, L.L.P.

(57) ABSTRACT

A control device comprising an electric power supply control part controlling a supply of electric power to a rotary electrical machine so as to use the output electric power of a second battery to make up for insufficient output electric power of a first battery when driving a vehicle by just drive power of the rotary electrical machine and a startup preparation starting part starting a supply of electric power to the catalyst device to start preparation for startup of the internal combustion engine if driving a vehicle by just drive power of the rotary electrical machine and the state of charge of the second battery becomes less than the state of charge for preparation for startup. The startup preparation starting part is configured to increase the state of charge for preparation for startup when the maximum output electric power of the first battery calculated based on the state of the first battery is small compared to if it is large.

3 Claims, 5 Drawing Sheets

(51) Int. Cl.
*F02D 29/02* (2006.01)
*F02N 11/04* (2006.01)
*H01M 10/44* (2006.01)
*H02J 7/14* (2006.01)
*B60W 10/06* (2006.01)
*B60W 10/08* (2006.01)

(52) U.S. Cl.
CPC ................ *H02J 7/14* (2013.01); *B60W 10/06* (2013.01); *B60W 10/08* (2013.01)

(56) References Cited

U.S. PATENT DOCUMENTS

2019/0106098 A1* 4/2019 Wilkinson ............... B60K 6/46
2020/0086872 A1* 3/2020 Tamai ............. B60W 30/18072

* cited by examiner

CONTROL DEVICE

CROSS-REFERENCE TO RELATED APPLICATION

This application claims priority based on Japanese Patent Application No. 2018-015489 filed with the Japan Patent Office on Jan. 31, 2018, the entire contents of which are incorporated into the present specification by reference.

FIELD

The present disclosure relates to a control device.

BACKGROUND

Japanese Unexamined Patent Publication No. 2017-166463A discloses a hybrid vehicle provided with a battery used for starting up an internal combustion engine and a capacitor making up for insufficient output of the battery when starting up the internal combustion engine. Further, as a control device of the hybrid vehicle, one is disclosed which is configured so as to control the state of charge of the capacitor to a target state of charge corresponding to the outside air temperature when the engine is stopped so that no insufficient electric power occurs at the time of engine startup since if the outside air temperature becomes lower, the maximum output electric power of the battery becomes smaller.

SUMMARY

In the case of a vehicle provided with an electric heating type catalyst device (EHC; electrical heated catalyst) in an exhaust passage of an internal combustion engine, to reduce the exhaust emission, it is effective to supply electric power to the catalyst device in advance to heat the catalyst device before starting up the internal combustion engine and to start up the internal combustion engine after the catalyst device finishes warming up.

Here, in the above-mentioned conventional hybrid vehicle, if trying to heat the catalyst device before engine startup, it is necessary to use the capacitor to make up for insufficient output of the battery when it occurs. If the maximum output electric power of the battery falls at this time, the output electric power of the capacitor increases by that amount and the amount of electric power consumed by the capacitor increases. However, the factors due to which the maximum output electric power of a battery falls are not limited to the outside air temperature.

For this reason, in the above-mentioned conventional hybrid vehicle, if factors other than the outside air temperature cause the maximum output electric power of the battery to fall, the electric power of the capacitor is liable to become depleted during preparation for startup of the internal combustion engine (during heating of the catalyst device) and the capacitor is liable to become unable to make up for the insufficient output of the battery. That is, the electric power required for preparation for startup of the internal combustion engine is liable to become insufficient.

The present disclosure was made focusing on such a problem and has as its object to keep the electric power required for preparation for startup of an internal combustion engine from becoming insufficient.

To solve the above problem, according to one aspect of the present disclosure, there is provided a control device for controlling a vehicle. The vehicle comprises an internal combustion engine, a rotary electrical machine, a first battery, a second battery and an electric heating type catalyst device provided in an exhaust passage of the internal combustion engine. The control device comprises an electric power supply control part configured so as to control a supply of electric power to the rotary electrical machine so as to use the output electric power of the second battery to make up for insufficient output electric power of the first battery when driving the vehicle by just drive power of the rotary electrical machine, and a startup preparation starting part configured to start a supply of electric power to a catalyst device to start preparation for startup of the internal combustion engine when the state of charge of the second battery becomes less than the state of charge for preparation for startup, if driving the vehicle by just drive power of the rotary electrical machine. The startup preparation starting part is configured so as to increase the state of charge for preparation for startup if a maximum output electric power of the first battery calculated based on the state of the first battery is small compared to if the maximum output electric power is large.

According to this aspect of the present disclosure, it is possible to keep the electric power required for preparation for startup of the internal combustion engine from becoming insufficient.

DESCRIPTION OF EMBODIMENTS

Below, referring to the drawings, embodiments of the present disclosure will be explained in detail. Note that, in the following explanation, similar component elements are assigned the same reference signs.

First Embodiment

Figure 1:
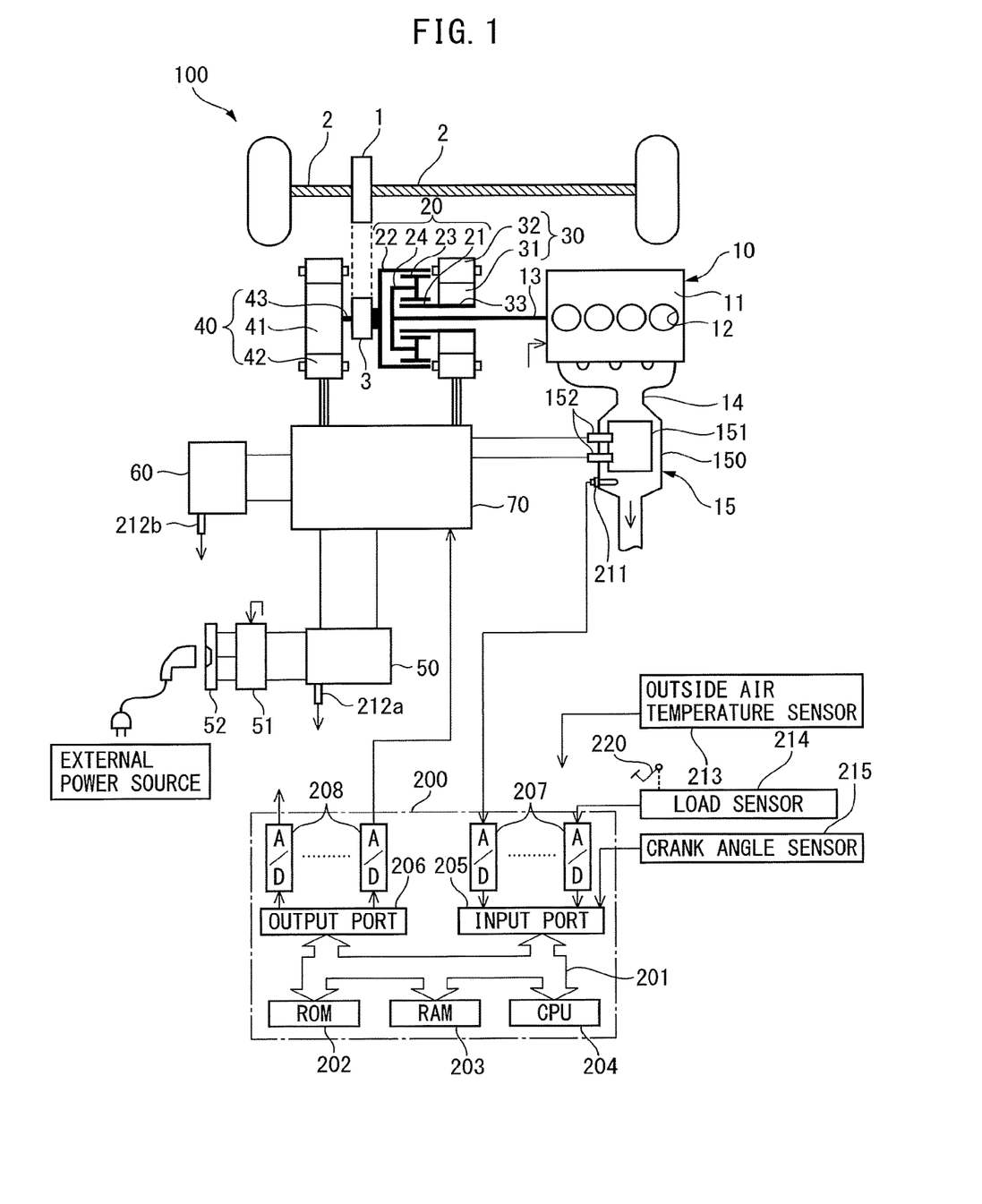
FIG. 1 is a schematic view of the configuration of a vehicle and an electronic control unit controlling the vehicle according to a first embodiment of the present disclosure.

FIG. 1 is a schematic view of the configuration of a vehicle 100 and an electronic control unit 200 controlling the vehicle 100 according to a first embodiment of the present disclosure.

The vehicle 100 is comprised of an internal combustion engine 10, drive power distribution mechanism 20, first rotary electrical machine 30, second rotary electrical machine 40, main battery 50, sub battery 60, and electric power control circuit 70 and is configured to enable the drive power of one or both of the internal combustion engine 10 and the second rotary electrical machine 40 to be transmitted to a driven object. In the present embodiment, it is configured to enable the drive power of one or both of the internal combustion engine 10 and the second rotary electrical machine 40 to be transmitted through a final deceleration device 1 to a wheel drive shaft 2.

The internal combustion engine 10 makes fuel burn inside cylinders 12 formed in an engine body 11 to generate drive power for making an output shaft 13 connected to a crankshaft rotate. The internal combustion engine 10 according to the present embodiment is a gasoline engine, but it may also be made a diesel engine. The exhaust discharged from the cylinders 12 to an exhaust passage 14 flows through the exhaust passage 14 and is discharged into the atmosphere. The exhaust passage 14 is provided with an electric heating type catalyst device (EHC; electrical heated catalyst) 15 for removing harmful substances in the exhaust.

The electric heating type catalyst device 15 comprises a housing 150, a honeycomb type conductor support 151 supporting a catalyst on its surface, and a pair of electrodes 152 for applying voltage to the conductor support 151.

The conductor support 151 is, for example, a support formed by silicon carbide (SiC), molybdenum disilicide ($MoSi_2$), or another material generating heat when carrying current. The conductor support 151 is provided inside the housing 150 in a state electrically insulated from the housing 150. In the present embodiment, the surface of the conductor support 151 is made to support a three-way catalyst, but the type of the catalyst made to be supported on the surface of the conductor support 151 is not particularly limited. It is possible to suitably select the catalyst necessary for obtaining the desired exhaust purification performance from various catalysts and make the conductor support 151 support it.

Downstream of the conductor support 151, a catalyst temperature sensor 211 for detecting a temperature of the conductor support 151 (below, referred to as "the catalyst bed temperature") is provided.

The pair of electrodes 152 are respectively electrically connected to the conductor support 151 in a state electrically insulated from the housing 150 and are connected through the electric power control circuit 70 to the main battery 50 and the sub battery 60. By applying voltage through the pair of electrodes 152 to the conductor support 151 to supply electric power to the conductor support 151, current flows to the conductor support 151 whereby the conductor support 151 is heated and the catalyst supported on the surface of the conductor support 151 is heated. The voltage applied to the conductor support 151 by the pair of electrodes 152 is adjusted by the electronic control unit 200 controlling the electric power control circuit 70.

The drive power distributing mechanism 20 is a planetary gear mechanism for dividing the drive power of the internal combustion engine 10 into two systems of drive power for making the wheel drive shaft 2 rotate and drive power for driving the regenerative operation of the first rotary electrical machine 30 and comprises a sun gear 21, ring gear 22, pinion gears 23, and a planetary carrier 24.

The sun gear 21 is an external gear and is arranged at the center of the drive power distributing mechanism 20. The sun gear 21 is coupled with the rotary shaft 33 of the first rotary electrical machine 30.

The ring gear 22 is an internal gear and is arranged around the sun gear 21 so as to be concentric with the sun gear 21. The ring gear 22 is coupled with the rotary shaft 33 of the second rotary electrical machine 40. Further, the ring gear 22 has attached to it an integrally formed drive gear 3 for transmitting rotation of the ring gear 22 to the wheel drive shaft 2 through the final deceleration device 1.

The pinion gear 23 is an external gear. A plurality are arranged between the sun gear 21 and ring gear 22 so as to mesh with the sun gear 21 and ring gear 22.

The planetary carrier 24 is coupled with the output shaft 13 of the internal combustion engine 10 and rotates about the output shaft 13. Further, the planetary carrier 24 is also coupled with the pinion gears 23 so that when the planetary carrier 24 rotates, the pinion gears 23 can individually turn (rotate) while turning (revolving) around the sun gear 21.

The first rotary electrical machine 30 is, for example, a three-phase AC synchronous type motor generator which is provided with a rotor 31 which is attached to the outer circumference of a rotary shaft 33 coupled with the sun gear 21 and which has a plurality of permanent magnets embedded in its peripheral part and a stator 32 around which is wound an excitation coil generating a rotating magnetic field. The first rotary electrical machine 30 has the function as a motor receiving a supply of electric power from the main battery 50 or the sub battery 60 and driving a powering operation and the function as a generator receiving drive power of the internal combustion engine 10 and driving a regenerative operation.

In the present embodiment, the first rotary electrical machine 30 is mainly used as a generator. Further, it is used as a motor when making the output shaft 13 rotate for cranking at the time of startup of the internal combustion engine 10 and performs the role as a starter.

The second rotary electrical machine 40 is, for example, a three-phase AC synchronous type motor generator which is provided with a rotor 41 which is attached to the outer circumference of a rotary shaft 43 coupled with the ring gear 22 and which has a plurality of permanent magnets embedded in its peripheral part and a stator 42 around which is wound an excitation coil generating a rotating magnetic field. The second rotary electrical machine 40 has the function as a motor receiving a supply of electric power from the main battery 50 or the sub battery 60 and driving a powering operation and the function as a generator receiving drive power from the wheel drive shaft 2 and driving a regenerative operation at the time of deceleration of the vehicle etc.

The main battery 50 is, for example, a nickel-cadmium storage battery or nickel-hydrogen storage battery, lithium ion battery, or other chargeable/dischargeable chemical battery.

The main battery 50 is electrically connected through the electric power control circuit 70 to the first rotary electrical machine 30 and the second rotary electrical machine 40 so as to enable the electric power of the main battery 50 to be supplied to the first rotary electrical machine 30 and the second rotary electrical machine 40 to drive the powering operation and so as to enable the generated electric power of the first rotary electrical machine 30 and the second rotary electrical machine 40 to be charged. Further the main battery 50 is electrically connected through the electric power control circuit 70 to the conductor support 151 as well so as to enable the electric power of the main battery 50 to be supplied to the conductor support 151 to heat the conductor support 151.

Further, the main battery 50 is, for example, configured to be able to be electrically connected to a household power outlet or other outside power source through a charging control circuit 51 and a charging lid 52 so that it can be charged from that outside power source. The charging control circuit 51 is an electrical circuit able to convert the AC current supplied from an outside power source to DC current and boost the input voltage to charge the electric power of the outside power source at the main battery 50 based on control signals of the electronic control unit 200.

The sub battery 60 is, for example, a capacitor or other battery able to be charged/discharged without being accompanied with chemical change. It is a battery with a higher output density [W/kg] (amount of electric power able to be charged and discharged per unit weight•unit time) than the main battery 50. The sub battery 60 is electrically connected through the electric power control circuit 70 to the first rotary electrical machine 30 and the second rotary electrical machine 40 so as to enable the electric power of the sub battery 60 to be supplied to the first rotary electrical machine 30 and the second rotary electrical machine 40 to drive the powering operation and, further, so as to enable the generated electric power of the first rotary electrical machine 30 and the second rotary electrical machine 40 to be charged. Further, the sub battery 60 is electrically connected through the electric power control circuit 70 to the conductor support 151 as well so as to enable the electric power of the sub battery 60 to be supplied to the conductor support 151 to heat the conductor support 151.

The electric power control circuit 70 is an electrical circuit configured to enable the electric power of the main battery 50 and the sub battery 60 to be selectively supplied to the first rotary electrical machine 30 or the second rotary electrical machine 40, conductor support 151, etc. based on a control signal from the electronic control unit 200 and further to enable the generated electric power of the first rotary electrical machine 30 and the second rotary electrical machine 40 to be selectively charged to the main battery 50 and the sub battery 60.

Note that in the present embodiment, when the state of charge SOCS of the sub battery 60 is less than a predetermined target state of charge SB1 (for example, 80% of the full state of charge), the electric power control circuit 70 is controlled by the electronic control unit 200 so that the generated electric power generated by the second rotary electrical machine 40 is preferentially charged to the sub battery 60 at the time of deceleration of the vehicle etc. until the state of charge SOCS of the sub battery 60 becomes the target state of charge SB1.

The electronic control unit 200 is comprised of a digital computer provided with components connected with each other by a bidirectional bus 201 such as a ROM (read only memory) 202, RAM (random access memory) 203, CPU (microprocessor) 204, input port 205, and output port 206.

The input port 205 receives as input through corresponding AD converters 207 output signals of the above-mentioned catalyst temperature sensor 211, a first SOC sensor 212a for detecting the state of charge SOCM of the main battery 50, a second SOC sensor 212b for detecting the state of charge SOCS of the sub battery 60, an outside air temperature sensor 213 for detecting the outside air temperature, etc. Further, the input port 205 receives as input through a corresponding AD converter 207 an output voltage of a load sensor 214 generating an output voltage proportional to the amount of depression of the accelerator pedal 220 (below, referred to as "the amount of accelerator depression"). Further, the input port 205 receives as input an output signal of a crank angle sensor 215 generating an output pulse every time a crankshaft of the engine body 11 rotates by for example 15° as a signal for calculating an engine speed N. In this way, the input port 205 receives as input the output signals of various sensors required for controlling the vehicle 100.

To the output port 206, spark plugs (not shown) of the engine body 11, the electric power control circuit 70, and other control parts are electrically connected through the corresponding drive circuits 208.

The electronic control unit 200 outputs control signals for controlling the control parts from the output port 206 to control the vehicle 100 based on the output signals of the various sensors input to the input port 205.

Below, the control of the vehicle 100 according to the present embodiment performed by the electronic control unit 200 will be explained.

The electronic control unit 200 sets a driving mode of the vehicle 100 to either an EV (electric vehicle) mode or an HV (hybrid vehicle) mode and performs driving control corresponding to the driving modes.

When setting the driving mode of the vehicle 100 to the EV mode, the electronic control unit 200 basically makes the internal combustion engine 10 stop and in that state uses the electric power of the main battery 50 to drive the powering operation of the second rotary electrical machine 40 and use only the drive power of the second rotary electrical machine 40 to make the wheel drive shaft 2 rotate.

At this time, from the viewpoint of suppression of deterioration of the main battery 50, an upper limit value is set for the output electric power of the main battery 50. For this reason, for example when at the time of a demand for rapid acceleration the amount of accelerator depression increases and the demanded output electric power becomes a predetermined electric power or more etc., sometimes with just the output electric power of the main battery 50, the electric power becomes insufficient and the drive power becomes insufficient. Therefore, in such a case, the electronic control unit 200 basically makes up for the insufficient electric power by the electric power of the sub battery 60. That is, when with just the output electric power of the main battery 50, the electric power becomes insufficient, the electronic control unit 200 uses the electric power of the main battery 50 and the sub battery 60 to drive the powering operation of the second rotary electrical machine 40 and uses only the drive power of the second rotary electrical machine 40 to make the wheel drive shaft 2 rotate.

Further, when the state where the output electric power of the main battery 50 is insufficient relative to the demanded output electric power continues for a long period of time and the state of charge of the sub battery 60 becomes less than a predetermined low state of charge SBL (for example about 0 to several % of the full state of charge), it is no longer possible to use the electric power of the sub battery 60 to make up for the insufficient electric power, so the electronic control unit 200 as an exception starts up the internal combustion engine 10 to transmit the drive power of the internal combustion engine 10 to the wheel drive shaft 2 and uses the electric power of the main battery 50 to drive the powering operation of the second rotary electrical machine 40 to transmit the drive power of both the internal combustion engine 10 and the second rotary electrical machine 40 to the wheel drive shaft 2.

In this way, the EV mode is a mode where the electric power of the main battery 50 and the sub battery 60 is preferentially utilized to drive the powering operation of the second rotary electrical machine 40 and at least the drive power of the second rotary electrical machine 40 is transmitted to the wheel drive shaft 2 to make the vehicle 100 run.

On the other hand, when setting the driving mode of the vehicle 100 to the HV mode, the electronic control unit 200 divides the drive power of the internal combustion engine 10 into two systems by the drive power distributing mechanism 20, transmits one divided drive power of the internal combustion engine 10 to the wheel drive shaft 2, and uses the other drive power to drive a regenerative operation of the first rotary electrical machine 30. Further, basically, it uses the generated electric power of the first rotary electrical machine 30 to drive a powering operation of the second rotary electrical machine 40 and transmits one drive power of the internal combustion engine 10 plus the drive power of the second rotary electrical machine 40 to the wheel drive shaft 2. As an exception, for example, when the amount of accelerator depression increases and the vehicle demanded output becomes a predetermined output or more etc., to secure the driving performance of the vehicle 100, it uses the generated electric power of the first rotary electrical machine 30 and the electric power of the main battery 50 to drive the powering operation of the second rotary electrical machine 40 and transmits the drive power of both of the internal combustion engine 10 and the second rotary electrical machine 40 to the wheel drive shaft 2.

In this way, the HV mode is a mode where the internal combustion engine 10 is operated and the generated electric power of the first rotary electrical machine 30 is preferentially utilized to drive a powering operation of the second rotary electrical machine 40 and the drive power of both of the internal combustion engine 10 and the second rotary electrical machine 40 is transmitted to the wheel drive shaft 2 to make the vehicle 100 run.

Here, the harmful substances in the exhaust discharged from the cylinders 12 of the internal combustion engine 10 to the exhaust passage 14 are removed by the catalyst device 15 provided in the exhaust passage 14 and discharged into the atmosphere. In order for the catalyst device 15 to exhibit the desired exhaust purification performance, the catalyst supported at the conductor support 151 has to be raised in temperature to the activation temperature to make the catalyst active. For this reason, to keep the exhaust emission after engine startup from deteriorating, preferably current starts to be supplied to the conductor support 151 before engine startup to start warm-up of the catalyst device 15 and the internal combustion engine 10 is started up after the catalyst device 15 finishes being warmed up (after the catalyst is activated).

However, as explained above, if, during the EV mode, for example, a demand for rapid acceleration arises and a state where it is necessary to use the electric power of the sub battery 60 in addition to the electric power of the main battery 50, that is, the state where the output electric power of the main battery 50 becomes insufficient relative to the demanded output electric power, continues for a long time and the state of charge SOCS of the sub battery 60 becomes less than the low state of charge SBL, as an exception it is necessary to start up the internal combustion engine 10. Further, during the EV mode, it is difficult to predict if a state has arisen where the output electric power of the main battery 50 has become insufficient relative to the demanded output electric power and further how long that state will continue.

For this reason, in the present embodiment, when the state of charge SOCS of the sub battery 60 becomes less than a state of charge SB2 for preparation for startup which is larger than the low state of charge SBL and smaller than the target state of charge SB1, if the catalyst bed temperature TEHC is less than a predetermined activation temperature T1, the electric power of the sub battery 60 is used to start warm-up of the catalyst device 15 and prepare for startup of the internal combustion engine 10. Due to this, even if after that the state of charge of the sub battery 60 becomes less than the low state of charge SBL and the internal combustion engine 10 has to be started up, it is possible to keep the exhaust emission from deteriorating.

However, the maximum output electric power of the main battery 50 changes in accordance with the state of charge SOCM of the main battery 50, the outside air temperature, and other states of the main battery 50. For this reason, when the maximum output electric power of the main battery 50 falls below normal and the state becomes one where the output electric power of the main battery 50 becomes insufficient relative to the demanded output electric power, the output electric power of the sub battery 60 increases by exactly that amount.

Therefore, if making the state of charge SB2 for preparation for startup a constant value, the state of charge of the sub battery 60 is liable to end up becoming less than the low state of charge SBL before the catalyst device 15 finishes warming up. This being so, to secure the driving performance, it is necessary to start up the internal combustion engine 10 before the catalyst device 15 finishes warming up. As a result, the harmful substances in the exhaust can no longer be sufficiently removed by the catalyst device 15, so the exhaust emission deteriorates. Further, to keep the exhaust emission from deteriorating, it is necessary to wait until the catalyst device 15 finishes warming up, so the driving performance can no longer be secured.

Therefore, in the present embodiment, the state of charge SB2 for preparation for startup was made to change in accordance with the maximum output electric power of the main battery 50. Specifically, the state of charge SB2 for preparation for startup is made to become larger when the maximum output electric power of the main battery 50 is small compared to when it is large. Due to this, when the state of the output electric power of the main battery 50 being insufficient relative to the demanded output electric power continues for a long time during the EV mode, it is possible to keep the state of charge SOCS of the sub battery 60 from becoming less than the low state of charge SBL before the catalyst device 15 finishes warming up. That is, it is possible to keep the electric power required for preparation for startup of the internal combustion engine 10 from becoming insufficient.

Below, the control for preparation for startup of the internal combustion engine 10 in the case where the state arises of the output electric power of the main battery 50 becoming insufficient relative to the demanded output electric power during the EV mode according to this present embodiment will be explained.

Figure 2:
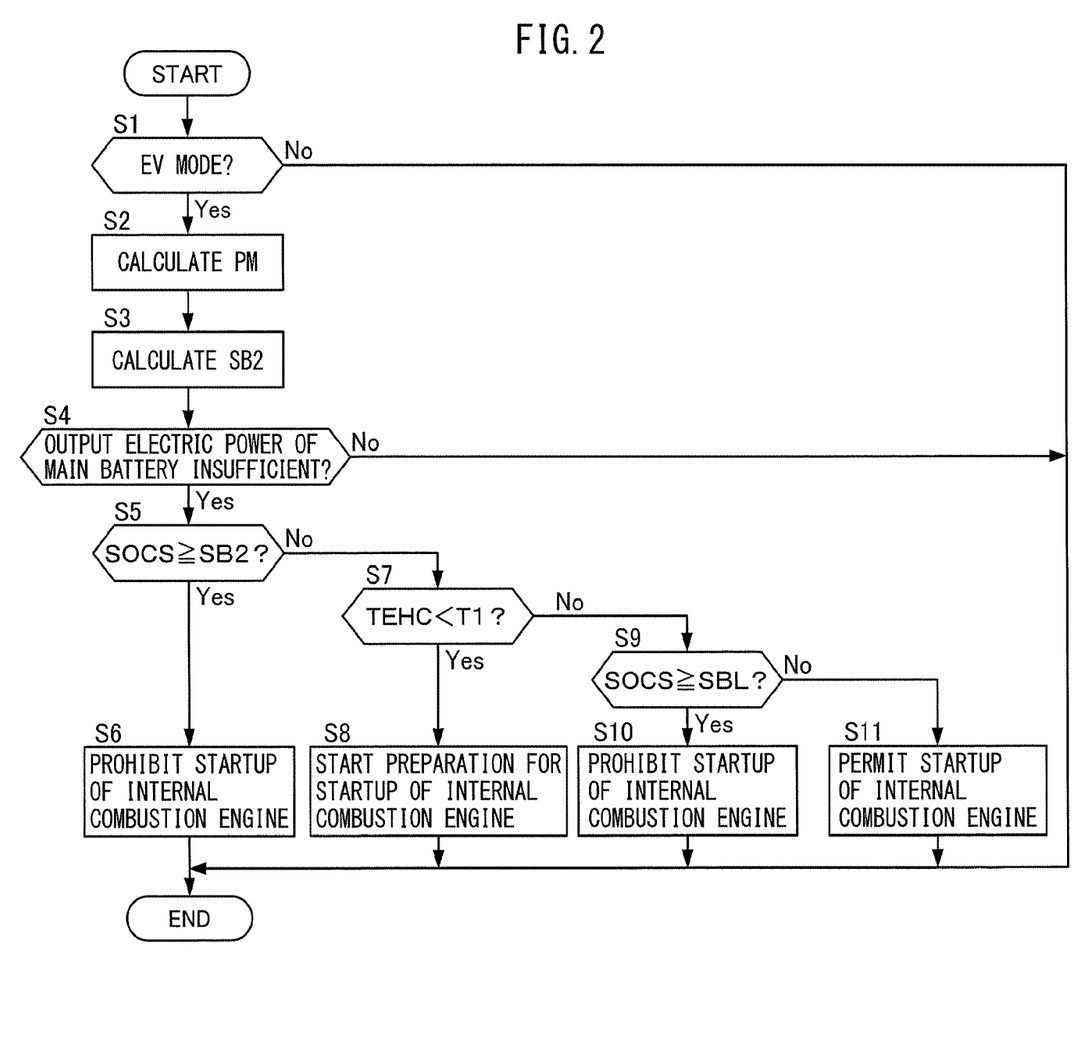
FIG. 2 is a flow chart for explaining control for preparation for startup of an internal combustion engine according to the first embodiment of the present disclosure.

FIG. 2 is a flow chart for explaining control for preparation for startup of the internal combustion engine 10 according to the present embodiment. The electronic control unit 200 repeatedly performs the present routine by a predetermined processing period.

At step S1, the electronic control unit 200 judges if the driving mode of the vehicle 100 is set to the EV mode. The electronic control unit 200 proceeds to the processing of step S2 if the driving mode of the vehicle 100 is set to the EV mode. On the other hand, the electronic control unit 200 ends the current processing if the driving mode of the vehicle 100 is set to the HV mode.

At step S2, the electronic control unit 200 calculates the maximum output electric power PM [kW] of the main battery 50. In the present embodiment, the electronic control unit 200 refers to a map prepared by experiments etc. in advance and calculates the maximum output electric power PM of the main battery 50 based on the state of charge SOCM of the main battery 50 and the outside air temperature. The maximum output electric power PM of the main battery 50 basically tends to become larger when the state of charge SOCM of the main battery 50 is large compared to when it is small. Further the maximum output electric power PM of the main battery 50 basically tends to become larger when the outside air temperature is high compared to when it is low.

Note that, the parameters for calculating the maximum output electric power PM of the main battery 50 are not limited to the state of charge SOCM of the main battery 50 and the outside air temperature. In addition to these or instead of these, it is also possible to use other parameters correlated with the maximum output electric power PM of the main battery 50 (for example, the temperature of the main battery 50 etc.).

Figure 3:
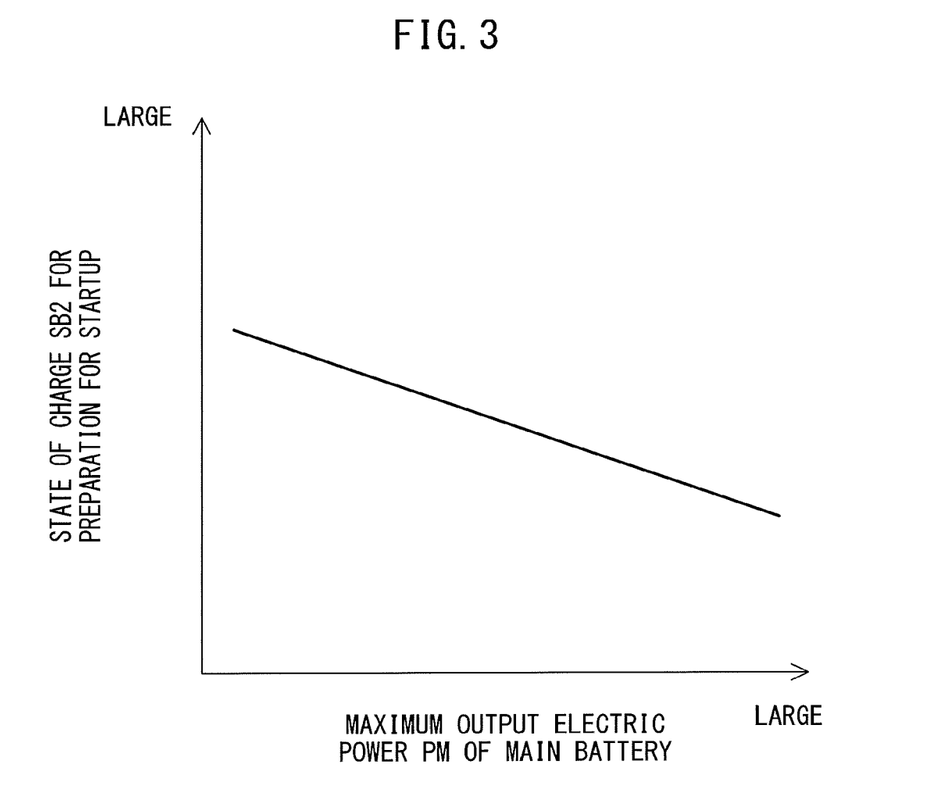
FIG. 3 is a table for setting the state of charge for preparation for startup based on the maximum output electric power of the main battery.

At step S3, the electronic control unit 200 sets the state of charge SB2 for preparation for startup based on the maximum output electric power PM of the main battery 50. In the present embodiment, the electronic control unit 200 refers to the table prepared by experiments etc. in advance and sets the state of charge SB2 for preparation for startup based on the maximum output electric power PM of the main battery 50. As shown in FIG. 3, the state of charge SB2 for preparation for startup becomes larger when the maximum output electric power PM of the main battery 50 is low compared to when it is high.

At step S4, the electronic control unit 200 judges if the output electric power of the main battery 50 is insufficient relative to the demanded output electric power. The electronic control unit 200 proceeds to the processing of step S5 if the output electric power of the main battery 50 is insufficient relative to the demanded output electric power. On the other hand, the electronic control unit 200 ends the current processing if the output electric power of the main battery 50 is not insufficient relative to the demanded output electric power.

At step S5, the electronic control unit 200 judges if the state of charge SOCS of the sub battery 60 is the state of charge SB2 for preparation for startup or more. The electronic control unit 200 proceeds to the processing of step S6 if the state of charge SOCS of the sub battery 60 is the state of charge SB2 for preparation for startup or more. On the other hand, the electronic control unit 200 proceeds to the processing of step S7 if the state of charge SOCS of the sub battery 60 is less than the state of charge SB2 for preparation for startup.

At step S6, the electronic control unit 200 prohibits the startup of the internal combustion engine 10 since there is still leeway until the state of charge SOCS of the sub battery 60 becomes less than the low state of charge SBL. Due to this, when the state becomes one where the output electric power of the main battery 50 is insufficient relative to the demanded output electric power, the insufficient electric power is made up for by the output electric power of the sub battery 60 and the electric power of the sub battery 60 is preferentially consumed.

At step S7, the electronic control unit 200 judges if the catalyst bed temperature TEHC detected by the catalyst temperature sensor 211 is less than a predetermined activation temperature T1. The electronic control unit 200 proceeds to the processing of step S8 if the catalyst bed temperature TEHC is less than the activation temperature T1. On the other hand, the electronic control unit 200 proceeds to the processing of step S9 if the catalyst bed temperature TEHC is the activation temperature T1 or more.

At step S8, the electronic control unit 200 starts the preparation for startup of the internal combustion engine 10. Specifically, the electronic control unit 200 supplies the electric power of the sub battery 60 to the conductor support 151 to warm up the catalyst device 15.

At step S9, the electronic control unit 200 judges if the state of charge SOCS of the sub battery 60 is the low state of charge SBL or more. The electronic control unit 200 proceeds to the processing of step S10 if the state of charge of the sub battery 60 is the low state of charge SBL or more. On the other hand, the electronic control unit 200 proceeds to the processing of step S11 if the state of charge of the sub battery 60 is less than the low state of charge SBL.

At step S10, the electronic control unit 200 prohibits the startup of the internal combustion engine 10. Due to this, after the catalyst bed temperature TEHC becomes the activation temperature T1 or more and until the state of charge SOCS of the sub battery 60 becomes less than the low state of charge SBL, the insufficient electric power can be made up for by the output electric power of the sub battery 60. For this reason, it is possible to keep down startup of the internal combustion engine 10 as much as possible, so it is possible keep the fuel efficiency and exhaust emission from deteriorating.

At step S11, the electronic control unit 200 permits the startup of the internal combustion engine 10 since it is not possible to make up for the shortage of electric power by the output electric power of the sub battery 60 if the state becomes one where the output electric power of the main battery 50 becomes insufficient relative to the demanded output electric power.

According to the present embodiment explained above, there is provided an electronic control unit 200 (control device) for controlling a vehicle 100 which is equipped with an internal combustion engine 10, a second rotary electrical machine 40 (rotary electrical machine), a main battery 50 (first battery), sub battery 60 (second battery) and an electric heating type catalyst device 15 provided in an exhaust passage 14 of the internal combustion engine 10. The electronic control unit 200 comprises an electric power supply control part controlling the supply of electric power to the second rotary electrical machine 40 so as to make up for the shortage of output electric power of the main battery 50 by the output electric power of the sub battery 60 when driving the vehicle by just the drive power of the second rotary electrical machine 40 and a startup preparation starting part starting the supply of electric power to the catalyst device 15 to start preparation for startup of the internal combustion engine 10 if driving the vehicle by just the drive power of the second rotary electrical machine 40 and the state of charge SOCS of the sub battery 60 is less than the state of charge SB2 for preparation for startup.

Further, the startup preparation starting part is configured so as to increase the state of charge SB2 for preparation for startup when the maximum output electric power PM of the main battery 50 calculated based on the state of the main battery 50 is small compared to when the maximum output electric power PM is large.

Due to this, it is possible to keep the state of charge SOCS of the sub battery 60 from ending up becoming less than the low state of charge SBL before warm-up of the catalyst device 15 ends when the state of the output electric power of the main battery 50 being insufficient relative to the demanded output electric power continues. That is, it is possible to keep the electric power required for preparation for startup of the internal combustion engine 10 from becoming insufficient when the state of the output electric power of the main battery 50 being insufficient relative to the demanded output electric power continues.

Second Embodiment

Next, a second embodiment of the present disclosure will be explained. The present embodiment differs from the first embodiment on the point of making the target state of charge SB1 of the sub battery 60 change based on the maximum output electric power of the main battery 60. Below, this point of difference will be explained.

In the above-mentioned first embodiment, the target state of charge SB1 of the sub battery 60 was made constant. As opposed to this, in the present embodiment, considering the time when the state of the output electric power of the main battery 50 being insufficient relative to the demanded output electric power continues for a long time, the target state of charge SB1 is made larger when the maximum output electric power PM of the main battery 50 is small compared to when it is large.

Due to this, it is possible to reduce the frequency by which the state of charge SOCS of the sub battery 60 becomes less than the state of charge SB2 for preparation for startup when a state arises where the output electric power of the main battery 50 becomes insufficient relative to the demanded output electric power. For this reason, it is possible to keep down the amount of consumption of electric power accompanying preparation for startup of the internal combustion engine 10. Further, the time during which the electric power of the sub battery 60 can be used to make up for the insufficient output electric power of the main battery 50 becomes longer, so it is possible to keep the internal combustion engine 10 from starting up to the maximum extent. For this reason, it is possible to keep the fuel efficiency and exhaust emission from deteriorating.

Below, the charging control (regeneration control) of the sub battery 60 according to the present embodiment will be explained.

Figure 4:
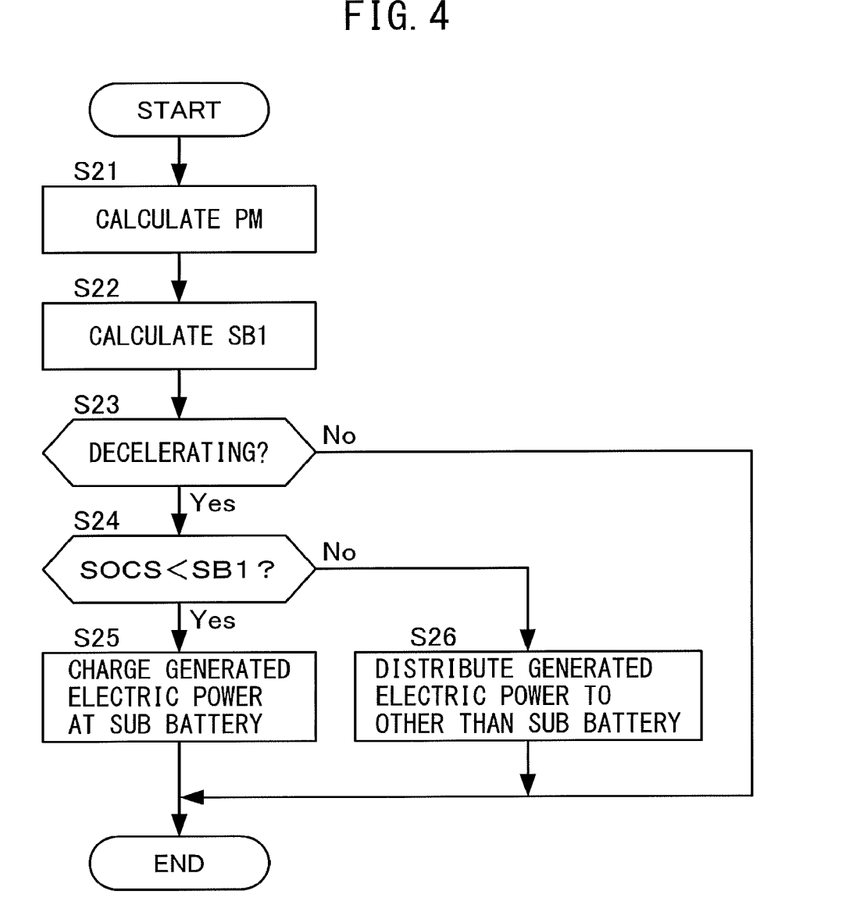
FIG. 4 is a flow chart for explaining control for charging a sub battery according to a second embodiment of the present disclosure.

FIG. 4 is a flow chart for explaining control for charging the sub battery 60 according to the present embodiment. The electronic control unit 200 repeatedly performs the present routine by a predetermined processing period.

At step S21, the electronic control unit 200 calculates the maximum output electric power PM [kW] of the main battery 50. In the present embodiment as well, in the same way as the first embodiment, the electronic control unit 200 refers to the map prepared by experiments etc. in advance and calculates the maximum output electric power PM of the main battery 50 based on the state of charge SOCM of the main battery 50 and the outside air temperature.

Figure 5:
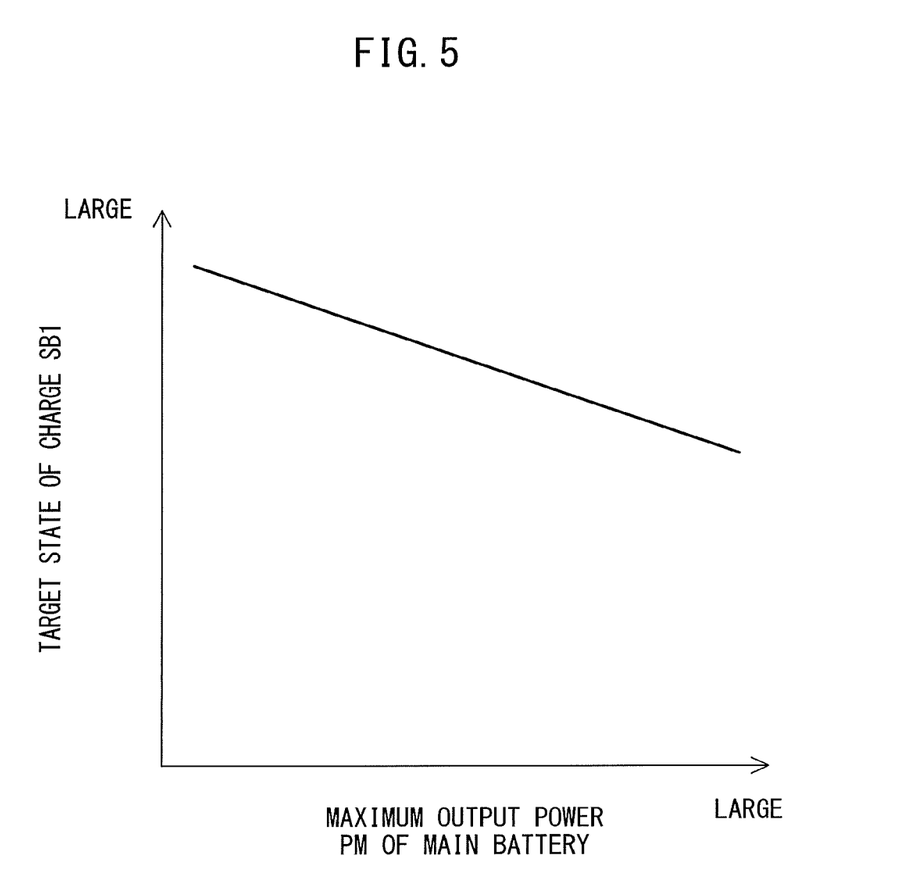
FIG. 5 is a table for setting the target state of charge of the sub battery based on the maximum output electric power of the main battery.

At step S22, the electronic control unit 200 sets the target state of charge SB1 based on the maximum output electric power PM of the main battery 50. In the present embodiment, the electronic control unit 200 refers to the table of FIG. 5 prepared by experiments etc. in advance and sets the target state of charge SB1 based on the maximum output electric power PM of the main battery 50. As shown in FIG. 5, the target state of charge SB1 becomes larger when the maximum output electric power PM of the main battery 50 is low compared to when it is high.

At step S23, the electronic control unit 200 judges if the vehicle is decelerating. In the present embodiment, the electronic control unit 200 judges if the amount of accelerator depression is zero. If the vehicle is decelerating, the electronic control unit 200 proceeds to the processing of step S24, while if not decelerating, it ends the current processing.

At step S24, the electronic control unit 200 judges if the state of charge SOCS of the sub battery 60 is less than the target state of charge SB1. The electronic control unit 200 proceeds to the processing of step S25 if the state of charge SOCS of the sub battery 60 is less than the target state of charge SB1. On the other hand, the electronic control unit 200 proceeds to the processing of step S256 if the state of charge SOCS of the sub battery 60 is the target state of charge SB1 or more.

At step S25, the electronic control unit 200 preferentially charges the generated electric power of the second rotary electrical machine 40 at the sub battery 60 so that the state of charge SOCS of the sub battery 60 becomes the target state of charge SB1.

At step S26, the electronic control unit 200 distributes the generated electric power of the second rotary electrical machine 40 to the main battery 50 or other electric power devices etc. in accordance with need.

The electronic control unit 200 according to the present embodiment (control device) explained above is further provided with, in addition to the electric power supply control part and startup preparation starting part explained above in the first embodiment, a charging control part charging the generated electric power of the second rotary electrical machine 40 at the sub battery 60 (second battery) so that the state of charge SOCS of the sub battery 60 becomes the target state of charge SB1.

Further, the charging control part is configured so as to increase the target state of charge SB1 if the maximum output electric power PM of the main battery 50 (first battery) is small compared to if the maximum output electric power PM is large.

Due to this, it is possible to reduce the frequency by which the state of charge SOCS of the sub battery 60 becomes less than the state of charge SB2 for preparation for startup when a state arises where the output electric power of the main battery 50 is insufficient relative to the demanded output electric power. For this reason, it is possible to keep down the amount of consumption of electric power accompanying preparation for startup of the internal combustion engine 10. Further, the time during which the electric power of the sub battery 60 can be used to make up for the insufficient output electric power of the main battery 50 becomes longer, so it is possible to keep the internal combustion engine 10 from starting up to the maximum extent. For this reason, it is possible to keep the fuel efficiency and exhaust emission from deteriorating.

Above, embodiments of the present disclosure were explained, but the above embodiments only show some of the examples of application of the present disclosure and are not meant to limit the technical scope of the present disclosure to the specific constitutions of the above embodiments.

The invention claimed is:

1. A control device for controlling a vehicle, the vehicle including an internal combustion engine, a rotary electrical machine, a first battery, a second battery, and an electric heating type catalyst device provided in an exhaust passage of the internal combustion engine, the control device comprising:
    an electric power supply control part configured so as to control a supply of electric power to the rotary electrical machine so as to use output electric power of the second battery to make up for insufficient output electric power of the first battery when driving the vehicle by just drive power of the rotary electrical machine;
    a startup preparation starting part configured to start a supply of electric power to the catalyst device to start preparation for startup of the internal combustion engine when a state of charge of the second battery becomes less than a startup state of charge threshold for preparation to start the supply of electric power to the catalyst device, when driving the vehicle by just the drive power of the rotary electrical machine; and an outside air temperature sensor that detects an outside air temperature of the vehicle, wherein the startup preparation starting part is configured to increase the startup state of charge threshold relative to a decrease in a maximum output electric power of the first battery calculated based on a state of the first battery, and the maximum output electric power of the first battery is calculated based on the outside air temperature.

2. The control device according to claim 1, the control device further comprising:

a charging control part configured to supply a generated electric power of the rotary electrical machine to the second battery so that the state of charge of the second battery becomes a target state of charge and the charging control part is configured so as to increase the target state of charge relative to the decrease in the maximum output electric power of the first battery.

3. The control device according to claim 2, wherein the startup state of charge threshold is lower than the target state of charge.

* * * * *